Patented Oct. 15, 1929

1,731,678

UNITED STATES PATENT OFFICE

ROBERT GRAHAM MEWBORNE, OF ALBUQUERQUE, NEW MEXICO, ASSIGNOR TO CONSUMERS TOBACCO COMPANY, OF ALBUQUERQUE, NEW MEXICO, A CORPORATION OF DELAWARE

PARASITICIDE AND PROCESS OF MAKING THE SAME

No Drawing. Application filed October 23, 1925, Serial No. 64,461. Renewed August 6, 1927.

This invention relates to a parasiticide and process of manufacturing the same. More particularly my invention relates to a parasiticide involving nicotine as the dominant toxic agent or poison and having utility in the treatment of animals such as cattle, sheep or the like which are subject to a particular contagious itch parasite such as scabies or ticks.

This treatment is most effectually practised by dipping or causing the animal to swim through a bath containing the parasiticide compound in specially arranged wading or dipping pools through which the animals are forced to swim, wade or otherwise compelled to expose themselves to a complete submersion.

Of recent years, the importance of the treatment of cattle passing in interstate commerce has reached the stage where it has been found absolutely necessary to be imposed and regulated by the U. S. Department of Agriculture, before permitting transportation of cattle, sheep and the like from one State to another. Of the permitted dips which have gained any favor, are the lime-sulphur dips and the nicotine dips.

Where I have tried to use the lime-sulphur dips in order to obtain a concentration which will in any way be effective upon the animal to be treated, I have found that for the proper dilution even where I have used the most concentrated prepared liquids, the quantity required makes the use of prepared liquids almost prohibitive by reason of the increase in cost of freight rates, the effective dilution usually being that of one part of prepared liquid to fifteen of water.

Any attempts to avoid the increase in cost by reason of the added freight rates by the preparation on the job of a sulphur and lime have equally been found objectionable due to the uncertainty in strength of the composition that may be prepared by reason of the varying quality of the component ingredients which are used to make up the batch.

Of the nicotine parasiticides heretofore used, the only forms of any importance which have found their way on the market, with any degree of success, are those which carry the nicotine content as a compound of nicotine, for instance, in the form of a sulphate. This product is usually put up as a 40% solution considerably heavier than water and because of its concentrated highly poisonous character, requires dilution to a considerable extent in order to prevent poisoning of the sheep or cattle which pass therethrough, at the same time it is still required that the bath retain the strength necessary to be effective as a parasiticide. The use of this form of nicotine leaves a very narrow limiting range and requires careful attention and regulation in order to have the nicotine of sufficient strength to serve its intended purpose and to control it within limits where it will not poison the cattle. To this extent, the use of this product lacks fool-proofness.

There is further the rather obvious objection to the material thus placed on the market, in that it requires the added care and attention necessary in the handling of compounds in fluid condition.

The nicotine compounds hitherto used, found objectionable because of their physical characteristics, are in no measure for practical purposes compensated by their chemical characteristics and the materials though of relatively high purity in nicotine content, lack those components present in the original plant which have been determined not only to have bactericidal qualities but curative properties and value when applied to the animal infected by the parasites causing skin itch as a result of scabies or ticks. The nicotine products have also failed to cope with the difficulties arising when use is attempted to be made by dilution in water, particularly where the water used is of the "hard" variety either temporary or permanent, and to this extent, no nicotine dip has yet been provided which has served to properly "wet" the animal dipped, or which to most effectively treat the animal, has the nicotine solution absorbed to thoroughly distribute its parasiticidal value. On the contrary in the majority of cases, the water used is of the "hard" character and the "dip" gathers upon the animal's coat in large drops, failing utterly to saturate the infected areas and impart any curative effects.

Where I have attempted to overcome the difficulties of prepared nicotine products, by the use of natural tobacco material, I have further found the same objectionable because of the inability to obtain uniformity of results, due to the uncertain and variable nicotine content and because the nicotine content is still further subject to variation because of decomposition of the nicotine. This has been found to take place due to catalytic action, fermentation, chemical or bacteriological conversion of the nicotine alkaloid to other compounds, either partially or totally, changing the strength of the product after storage as to its essential property.

I have found that by maintaining tobacco material in a condition so as to deprive it of its inherent moisture content, the nicotine content is made available, as for instance, for a dipping compound having certainty of strength after long periods of storage. I have still further found that by intimately mixing an absorbent with tobacco material whose nicotine content has been ascertained, I can obtain a product whose nicotine content will be constant after prolonged periods of storage and when added to any vehicle as in a cattle dipping bath, the dilution will be according to predetermined calculations. Still further, I have found that by adding to tobacco material, an absorbent having slight alkaline properties, it will serve to retain constant the nicotine content of the tobacco material, and when added to a dipping bath using "hard" water, will serve to make the nicotine more readily active, simultaneously imparting "wetting" properties with respect to the animal to be treated in the dipping bath by "softening" the water. I have still further found that by adding an absorbent to tobacco material that I may keep constant its nicotine content and that by adding predetermined quantities of such absorbent proportional to its original nicotine content, I may obtain a bulky material having a fixed available nicotine content and which will form a definite strength dilution as for instance where it is used for making up a cattle dipping bath.

My invention, therefore, has for its object the provision of a tobacco material, including an agent in the nature of an absorbent to withdraw sufficient of the natural moisture of the tobacco to prevent deterioration or conversion of the nicotine content; the provision of a composition comprising tobacco material including an absorbent; the provision of a composition comprising tobacco material including an agent to prevent atmospheric moisture absorption by the tobacco material; the provision of a composition including a tobacco material and including a water softening agent; the provision of a composition including a tobacco material and including an absorbent rendering the nicotine content of the tobacco more readily available; the provision of a composition including a tobacco material and including an alkaline absorbent serving when in solution to make the nicotine content of the tobacco more available and serving to soften the water.

My invention still further has for its object the provision of a nicotine "dip" made up by the addition of a substantially dry agent; the provision of a nicotine dip made up by the addition to a water bath of a dry tobacco material; the provision of a nicotine "dip" made up by the addition to a water bath of a dry tobacco material whose nicotine content will remain constant throughout long periods of storage; the provision of a nicotine dip containing a water softening agent; the provision of a cattle "dip" made by the addition of a tobacco material and an absorbent; the provision of a cattle "dip" made by the addition of a tobacco material and an alkaline agent to a water bath; the provision of a cattle "dip" made by the addition to water of a tobacco material and bentonite as a water softening agent; the provision of a cattle "dip" including tobacco material and a water softening agent serving to facilitate the ready liberation of the nicotine content of the tobacco material; the provision of a cattle "dip" composition in which all the essential constituents of tobacco material are made available in combination with the nicotine content thereof.

My invention still further has for its object the provision of a cattle "dip" composition including tobacco material and a carrier in dry form, in which the carrier is proportioned to the nicotine content of the tobacco material, so that a predetermined quantity of the mixture per unit volume of water will always give a substantially definite percentage strength nicotine bath.

My invention still further has for its object the provision of a process of treating tobacco material so as to conserve the nicotine content thereof against deterioration; the provision of a process of treating tobacco material so as to conserve the nicotine content thereof against deterioration by the absorption of the moisture content thereof; the provision of a process of treating tobacco material so as to conserve the nicotine content thereof against deterioration by intimately grinding therewith an absorbent material.

To attain these objects and such further objects as may appear or be hereinafter pointed out, illustrative procedure will follow.

I have found that I can procure a compound having available nicotine in predetermined quantities and unaffected after prolonged storage by mixing tobacco material, either the leaves, stalks, roots or other parts thereof, with an absorbent capable preferably of absorbing the moisture content thereof. Preferably, these ingredients are intimately ground together in suitable grinding apparatus, as in a ball mill. Any high absorbent may be used, though for my purpose, as will subsequently appear, I grind the tobacco material with a clayey or argillaceous material such as bentonite.

As an example for producing a composition suitable for producing a cattle "dip", I mix 60 lbs. of finely ground tobacco containing about 10% of nicotine and 40 lbs. finely ground bentonite.

This mixture I can market as 6% nicotine cattle and sheep "dip". In storage the bentonite will protect the tobacco material against the reabsorption of moisture and so prevent any possible sweating and consequent decomposition and conversion of the nicotine.

It will be observed that when a mixture of the above nature is added to water, the bentonite acts effectively to aid the wetting process of the cattle dipped, particularly where the water used is of the "hard" variety.

However, though I have described as my preferred absorbent or water softener, the material such as bentonite, other absorbents may be used such as tripoli, glauconite, clay (preferably the plastic variety), feldspar, zeolites such as Permutit, soda ash, soaps or combinations of soda ash and lime. It will be observed that though absorbents are used, those having slight alkaline characteristics are preferable.

However, where the added absorbent is alkaline in character and likely to absorb atmospheric moisture in the dry product, tending to slowly liberate nicotine, I prefer to add dominant proportions of the inert absorbents in combination therewith, giving a mixture having the necessary water softening qualities at the same time protecting the nicotine against deterioration and liberation.

Where there is encountered both temporary and permanent hard water combinations of the above ingredients may be used.

In the above-cited example it will be understood that when working with a 10% nicotine tobacco, and it is desired to produce a 6% nicotine, the proportions are as indicated. However, as the nicotine content varies, to obtain a standard product, that is, for example 6%, the amount of absorbent or carrier will be diminished whereas with a higher nicotine tobacco, the amount of absorbent will be increased.

For purposes of rendering the nicotine of the tobacco material available and more reactive and for purposes of preventing its decomposition and deterioration by conversion, I have found that I may use as low as 1% of the inert absorbents such as tripoli or bentonite which is preferably combined with the tobacco material to coat the particles thereof.

Other variations will be in accordance with the strength it is desired to give the batch so far as available nicotine is concerned.

In accordance with my invention in preparing a "dip" having a nicotine content as required by the Government regulations within limits of .05 to .07% nicotine, I may, where I use about a 10% nicotine tobacco material, make use of a batch of 60 lbs. tobacco material
40 lbs. of absorbent such as bentonite or the like. By the addition of 100 lbs. of such a batch to 1,000 gallons of water, I obtain quickly a dipping bath within the limits effective as a parasiticide and yet insufficiently poisonous if imbibed by the animals. Thus, it will be observed that 100 lbs. of a mixture of 75 parts (about 8% nicotine) tobacco material and 25 parts of the carrier which may include an absorbent previously mentioned, may be added to 1,000 gallons of water to procure a "dip" within the regulations of the United States Bureau of Animal Industry, as to strength, which is similar to State regulations.

Also, it will be observed that if any other percentage strength nicotine composition is desired, the absorbent is added in accordance with the determination of the nicotine content of the raw material. However, it will be noted that once a batch is made in accordance with my process above outlined, the atmospheric moisture in combination with catalytic agents, organisms or bacteria, will not break down the nicotine, but the mixture will preserve its strength as to nicotine content. Also, the tobacco material in its entirety will be made available for its parasiticidal values.

The batch so made has particular value as a dipping composition as where the mixture is dry, the method of storage and transportation is comparatively simple, while by reason of its bulk, it is comparatively fool-proof in preparing a bath of fixed predetermined strength, whereby great accuracy is accomplished with great ease of operation.

Having thus described my invention and illustrated its use, what I claim as new and desire to secure by Letters Patent, is:

1. A new composition of matter comprising a tobacco product and an absorbent, the absorbent containing nicotine and aqueous constituents, said absorbent having an alkaline characteristic when admixed with water whereby when water is added, nicotine is released.

2. As a new composition of matter, a product containing nicotine and an absorbent therefor, serving to act as a water softening agent, when admixed with water whereby when the water is added nicotine is released.

3. As a new composition of matter, a product containing nicotine and bentonite.

4. A new composition of mattter in substantially dry form comprising a tobacco product and an absorbent, the absorbent containing nicotine and aqueous constituents, said absorbent having an alkaline characteristic when admixed with water, whereby when the water is added, nicotine is released.

5. As a new composition of matter, a dry product containing nicotine and bentonite.

6. As a new composition of matter, a dry tobacco material and a pulverulent absorbent for the nicotine whereby the product will retain the nicotine content of said tobacco in storage.

7. As a new composition of matter, a dry tobacco material having substantially the inherent moisture content thereof absorbed in bentonite and admixed therewith.

8. As a new composition of matter, a tobacco material having the inherent moisture thereof absorbed and commingled with an alkaline agent and an inert carrier and forming a dry pulverulent mass.

9. A parasiticide composition for dipping purposes containing nicotine and an alkaline material adapted to slowly liberate free nicotine when acted upon by water and a normally pulverulent material to protect said first mentioned composition against loss of nicotine in storage.

10. A dry pulverulent parasiticide composition for dipping purposes containing nicotine and an alkali and a coating material comprising bentonite for the particles thereof.

11. A parasiticide composition comprising tobacco material and a pulverulent carrier compound capable of slowly liberating alkali when acted upon by water.

12. A pulverulent composition of matter adapted to be used as a parasiticide including tobacco material and a pulverulent absorbent serving to preserve the nicotine content of the tobacco against deterioration in storage so that a predetermined quantity will give a definite dilution of nicotine per unit quantity of water.

13. A pulverulent composition of matter adapted to be used as a parasiticide including tobacco material and a pulverulent absorbent ground therewith.

14. The process of producing a dry composition of matter adapted to be used as a parasiticide including tobacco material having prolonged keeping qualities which comprises dehydrating a tobacco material without substantial loss of the nicotine content by adding an absorbent capable of preserving the nicotine content of said tobacco material.

15. The process of producing a dry composition of matter adapted to be used as a parasiticide including tobacco material having prolonged keeping qualities in storage which comprises dehydrating the water content of the tobacco by grinding bentonite therewith.

16. A dipping bath for animals containing water, a nicotine compound, a material containing an alkali which will react with the nicotine compound and slowly liberate free nicotine.

17. A dipping bath for animals containing water, a tobacco material, a material containing an alkali which will react with the tobacco material and slowly liberate free nicotine.

18. A dipping bath for animals containing water, a tobacco material, a material containing an alkali which will react with the tobacco and slowly liberate free nicotine, and facilitate wetting.

19. A dipping bath for animals containing water, a tobacco material and bentonite whereby nicotine will be slowly liberated and wetting will be facilitated.

20. As a new composition of matter, a mixture comprising tobacco material and bentonite.

In witness whereof, I have signed this specification, this 22nd day of October, A. D. 1925.

ROBERT GRAHAM MEWBORNE.